(12) United States Patent  (10) Patent No.: US 7,264,444 B2
Dunn  (45) Date of Patent: Sep. 4, 2007

(54) AEROFOILS

(75) Inventor: Shaun Stephen Dunn, South Petherton (GB)

(73) Assignee: Westland Helicopters Limited, Yeovil (GB)

( * ) Notice: Subject to any disclaimer, the term of this patent is extended or adjusted under 35 U.S.C. 154(b) by 315 days.

(21) Appl. No.: 10/958,589

(22) Filed: Oct. 6, 2004

(65) Prior Publication Data

US 2005/0207895 A1 Sep. 22, 2005

(30) Foreign Application Priority Data

Mar. 16, 2004 (GB) .................... 0405843.4

(51) Int. Cl.
F01D 3/02 (2006.01)
(52) U.S. Cl. .................. 416/97 R; 415/115; 415/116
(58) Field of Classification Search .................. 416/91, 416/96 R, 97 R, 97 A; 415/115, 116
See application file for complete search history.

(56) References Cited

U.S. PATENT DOCUMENTS

| | | | |
|---|---|---|---|
| 1,887,148 A | | 11/1932 | Ganahl |
| 3,767,322 A | * | 10/1973 | Durgin et al. ............ 416/97 R |
| 4,169,567 A | | 10/1979 | Tamura |
| 4,674,717 A | | 6/1987 | Loebert |
| 4,859,141 A | * | 8/1989 | Maisch et al. ............... 415/115 |
| 5,479,400 A | | 12/1995 | Dilworth et al. |
| 5,813,625 A | | 9/1998 | Hassan et al. |
| 6,109,566 A | | 8/2000 | Miller et al. |
| 6,142,425 A | * | 11/2000 | Armanios et al. .......... 244/207 |
| 6,283,406 B1 | | 9/2001 | Remington et al. |
| 6,654,616 B1 | | 11/2003 | Pope, Jr. et al. |
| 6,687,503 B1 | | 2/2004 | Porter |
| 6,728,514 B2 | | 4/2004 | Bandeira et al. |
| 2004/0014442 A1 | | 1/2004 | Okanobu |

FOREIGN PATENT DOCUMENTS

| | | |
|---|---|---|
| GB | 304973 | 1/1929 |
| GB | 510546 | 8/1939 |
| GB | 573555 | 11/1945 |
| GB | 1264179 | 2/1972 |
| GB | 2 129 748 | 10/1983 |
| JP | 07-300098 A | 3/1996 |

OTHER PUBLICATIONS

Abstract 0402521.1.

* cited by examiner

*Primary Examiner*—Hoang Nguyen
(74) *Attorney, Agent, or Firm*—Stites & Harbison PLLC; Douglas E. Jackson

(57) ABSTRACT

An aerofoil has a body, and at least one flow control device, the flow control device including a passage within the body of the aerofoil, and a passage outlet at an upper aerofoil surface of the aerofoil, whereby in use, air from the passage passes through the passage outlet to affect airflow over the upper surface of the aerofoil over at least a range of incidence angles, wherein the passage outlet is provided by an outlet fitting which is secured relative to the upper surface of the aerofoil, the outlet fitting including a surface part which lies contiguously with the surrounding upper aerofoil surface so there is no or only a minimal discontinuity where the surface part and the surrounding upper aerofoil surface interface, the surface part of the fitting further including an opening which communicates with the passage within the body of the aerofoil.

22 Claims, 2 Drawing Sheets

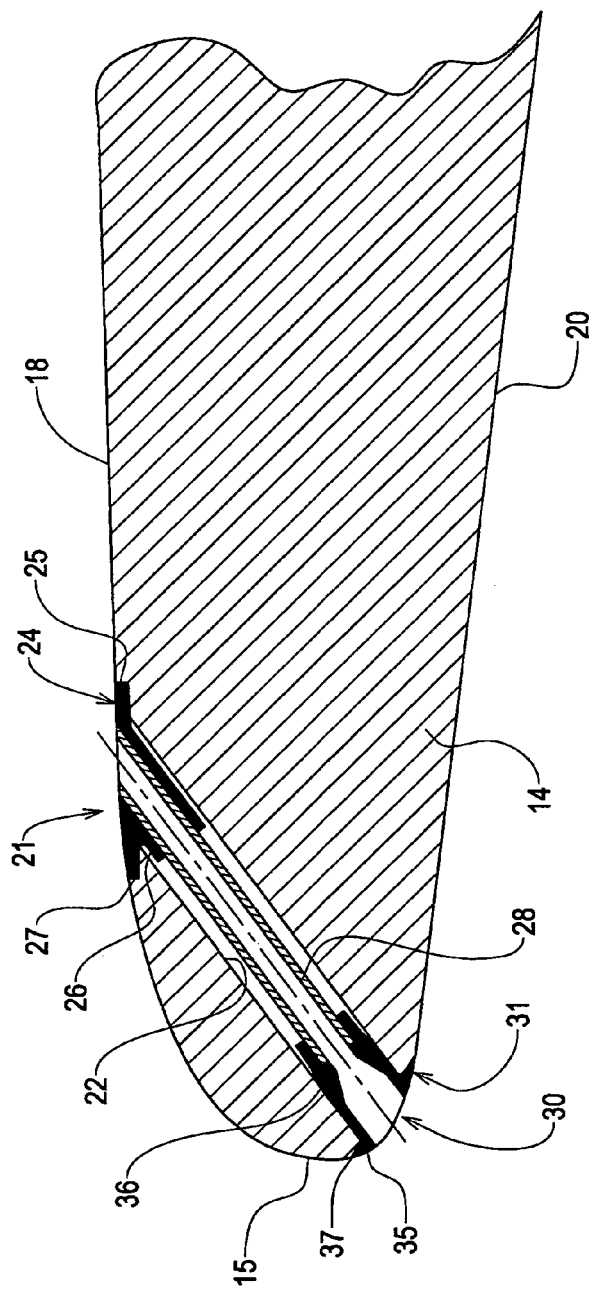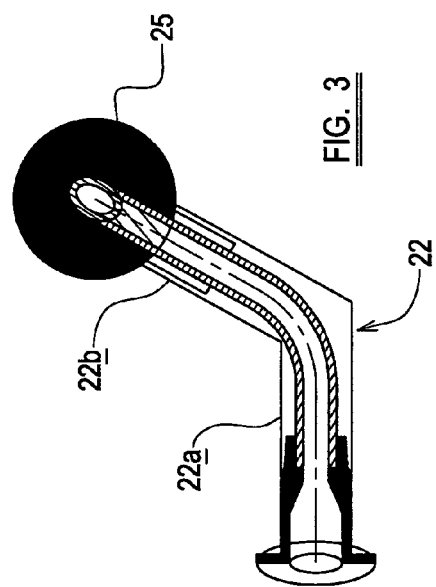

AEROFOILS

BACKGROUND TO THE INVENTION

This invention related to an aerofoil having a flow control device commonly known as a air jet vortex generator or AJVG.

An AJVG typically includes a passage within the aerofoil, the passage opening at an upper aerofoil surface of the aerofoil, whereby in use, air from the passage passes through the opening to affect airflow over the upper surface of the aerofoil over at least a range of incidence angles.

An AJVG may be provided to energise boundary airflow over the upper aerofoil surface, to assist the airflow in overcoming a large pressure gradient, which particularly but not exclusively may be encountered at high incidence angles. Thus an AJVG may be used to delay stalling, to increase lift and reduce drag on the aerofoil as the aerofoil moves through the air.

The invention has particularly but not exclusively been developed for use on an aircraft wing, which may be either a fixed wing or a rotating wing such as a helicopter blade.

In order to provide a desired airflow affecting characteristic, the position and shape of the opening in the upper aerofoil surface is critical.

DESCRIPTION OF THE PRIOR ART

Helicopter blades at least, typically are fabricated by moulding in compound materials typically including resin and reinforcing materials. Such materials do not readily lend themselves to the formation of accurately shaped openings, and moreover, the provision of a discontinuity such as an opening, can lead to erosion and other undesirable aerofoil wear, particularly in the region of the opening.

SUMMARY OF THE INVENTION

According to a first aspect of the invention we provide an aerofoil having a body, and at least one flow control device, the flow control device including a passage within the body of the aerofoil, and a passage outlet at an upper aerofoil surface of the aerofoil, whereby in use, air from the passage passes through the passage outlet to affect airflow over the upper surface of the aerofoil over at least a range of incidence angles, wherein the passage outlet is provided by an outlet fitting which is secured relative to the upper surface of the aerofoil, the outlet fitting including a surface part which lies contiguously with the surrounding upper aerofoil surface so there is no or only a minimal discontinuity where the surface part and the surrounding upper aerofoil surface interface, the surface part of the fitting further including an opening which communicates with the passage within the body of the aerofoil.

Thus the exact desired shape of an opening from the passage, to achieve a desired airflow affecting characteristic, may be more easily provided by the provision of the outlet fitting. The fitting may be made in a durable material which is more resistant to erosion than the materials of the body, and fitted to the aerofoil surface so that the interface between the fitting and the upper aerofoil surface is smooth, i.e. so that no or a minimal discontinuity is provided.

The invention has particularly but not exclusively been developed for a so-called passive AJVG, i.e. the device includes an inlet opening for air at or closely adjacent to a lower aerofoil surface, the air passing into the inlet opening of the passage and flowing to the passage outlet at the upper aerofoil surface afforded by the outlet fitting, by the movement of the aerofoil through the air.

Desirably the flow control device includes an inlet fitting which is secured relative to the aerofoil, desirably at an inlet position at or closely adjacent the lower aerofoil surface, the inlet fitting including a surface part which lies contiguously with the surrounding lower aerofoil surface so there is no or only a minimal discontinuity where the surface part and the surrounding lower aerofoil surface interface, the surface part of the inlet fitting further including an inlet opening which communicates with the passage within the body of the aerofoil. Thus a desired shape of inlet opening too, may be provided and the inlet fitting may again be made in a durable material which is resistant to erosion, i.e. is more durable than the material of the body, and fitted to the aerofoil surface so that the interface between the fitting and the adjacent aerofoil surface is smooth, i.e. so that no or a minimal discontinuity is provided.

Typically the passage in the aerofoil is provided subsequent to moulding the aerofoil, e.g. by drilling. Typically the drilling process may provide a pair of passage parts which intersect non co-axially. Thus air flowing through the passage needs to undergo an abrupt change of direction which is undesirable.

Accordingly preferably the aerofoil of the invention includes a flexible conduit within the passage, the conduit extending to the passage outlet. Although the outlet fitting and the flexible conduit may be monolithic, alternatively these may be interconnected. In each case it will be appreciate that the flexible conduit may have a cross section which is ideal for the most efficient air flow through the passage, such as round, whilst the outlet provided by the outlet fitting may be of an alternative desired shape to achieve an optimum affect on the airflow over the upper aerofoil surface.

The flexible conduit, which may be a plastic such as polyurethane, thus will allow optimised airflow through the passage, as the conduit may smooth any otherwise abrupt changes of direction of the airflow. Of course where an inlet fitting is provided, the flexible conduit may be integral with the inlet fitting or connected to the inlet fitting as desired.

In a preferred example, the outlet fitting includes a surface part shaped so that when the fitting is secured relative to the upper surface of the aerofoil, the surface part lies substantially contiguously with the surrounding aerofoil upper surface, and a hollow spigot part which extends into the passage for interconnection to the flexible conduit, and the inlet fitting includes a surface part which when the inlet fitting is secured at or adjacent to the lower aerofoil surface, lies substantially contiguously with the surrounding aerofoil surface, and a hollow spigot part which extends into the passage for connection to the flexible conduit.

The aerofoil may be a fixed wing of an aircraft or a rotor blade of a main sustaining or tail rotor of a helicopter.

Desirable a plurality of flow control devices are provided along a leading edge of the aerofoil.

According to a second aspect of the invention we provide an aerofoil having a body, and at least one flow control device, the flow control device including a passage within the body of the aerofoil, and a passage inlet at a position at or adjacent to a lower aerofoil surface of the aerofoil, whereby in use, air passes into the passage inlet and flows to an outlet on an upper aerofoil surface to affect airflow over the upper surface of the aerofoil over at least a range of incidence angles, wherein the passage inlet is provided by an inlet fitting which is secured at the inlet position at or closely adjacent the lower aerofoil surface of the aerofoil.

The aerofoil of the second aspect of the invention may have any of the features of the aerofoil of the first aspect of the invention.

According to a third aspect of the invention we provide an aircraft having an aerofoil in accordance with the first or second aspects of the invention.

According to a fourth aspect of the invention we provide a method of making an aerofoil in accordance with the first or second aspect of the invention, the method including the steps of providing a passage within an aerofoil body including an upper aerofoil surface and a lower aerofoil surface, the passage extending from an inlet position at or adjacent the lower aerofoil surface and a passage outlet at the upper aerofoil surface, and one or both of securing relative to the upper surface of the aerofoil an outlet fitting and securing at the inlet position at or adjacent to the lower aerofoil surface, an inlet fitting.

The method may include providing both the inlet and outlet fittings and providing between the inlet and outlet fittings, a flexible conduit which is integral or connected to one or each of the inlet and outlet fittings.

BRIEF DESCRIPTION OF THE DRAWINGS

Embodiments of the invention will now be described with reference to the accompanying drawings in which:

FIG. 2 is a more detailed cross sectional view through part of the aerofoil shown in FIG. 1;

FIG. 3 is a plan view of a flow control device of the aerofoil of FIG. 2.

DETAILED DESCRIPTION OF THE PREFERRED EMBODIMENTS

Figure 1:
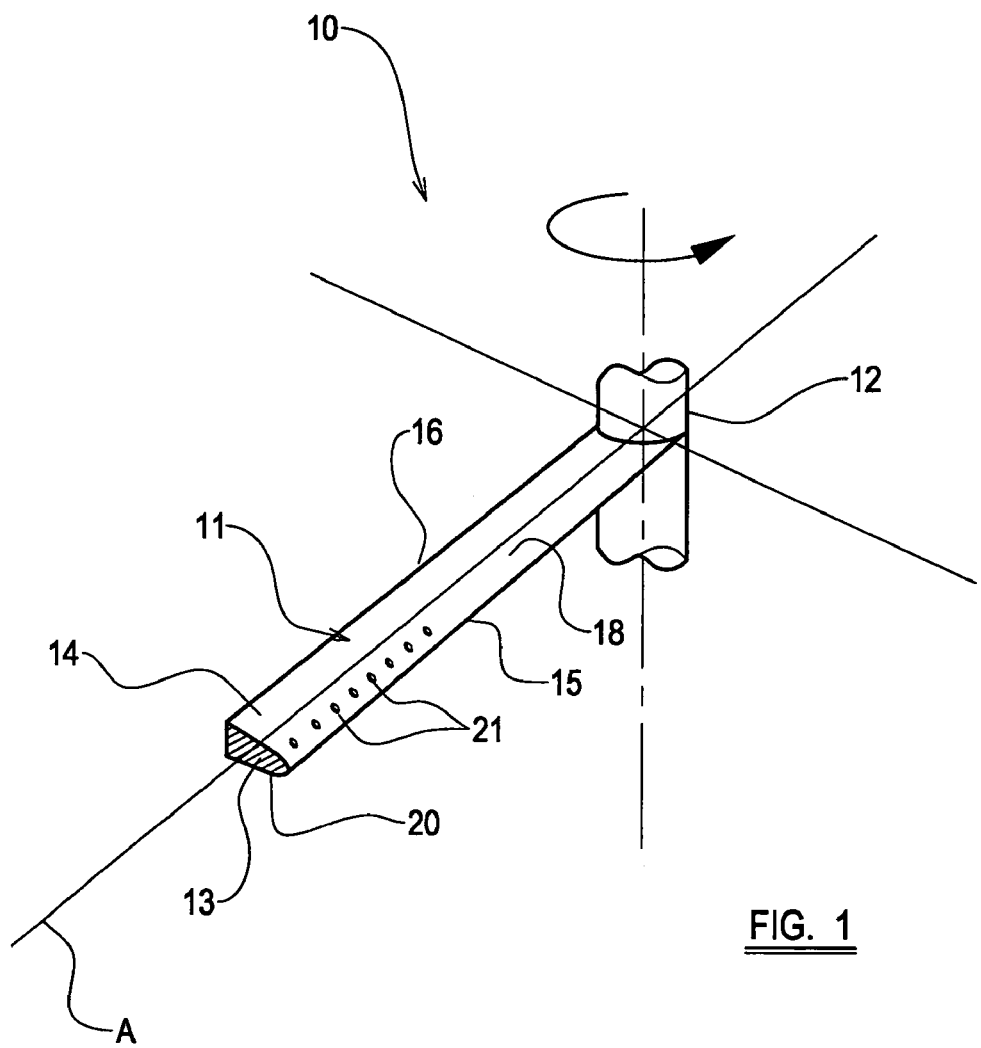
FIG. 1 is a schematic view of part of a helicopter showing an aerofoil in accordance with the invention.

Referring to the drawings, a main sustaining rotor assembly 10 of a helicopter has four blades, one of which is shown at 11, and the positions of the other blades being indicated by lines.

The blade 11 is an aerofoil over which in use, air flows to provide lift.

The rotor blade 11 extends from a root end 12 which typically is a rotor head or hub, outwardly along a blade span to a tip which is indicated at 13. In practice the tip 13 would be of a complex configuration but is shown in FIG. 1 schematically only to indicate the aerofoil cross section.

The blade 11 has an aerofoil body 14, with a leading edge 15, a trailing edge 16, an upper aerofoil surface 14 between the leading and trailing edges 15, 16, and a lower aerofoil surface 20 between the leading and trailing edges 15, 16.

In use, the blade 11 may be feathered about a blade axis A and thus the angle of incidence of the blade 11 to the air through which the blade 11 in use moves, may vary.

To delay stall, increase lift and/or reduce airflow drag as the aerofoil moves through the air, a plurality of flow control devices, namely passive AJVGs, are provided. Each of these includes a passage 22 within the aerofoil body 14, the passage 22 opening at the upper aerofoil surface 18 of the aerofoil 11, air in use, from the passage 22 passing through an outlet opening 21 to affect airflow over the upper surface 18 of the aerofoil 11 over at least a range of incidence angles.

In accordance with the invention, the flow control devices each include an outlet fitting 24 which in this example includes a surface part 25 with the outlet opening 21 provided therein the outlet opening 21 communicating with the passage 22 via a hollow spigot part 26 of the outlet fitting 24. The outlet fitting 24 is made in a material which is resistant to erosion or other wear at least at the outlet opening 21, and is secured relative to the upper surface 18 of the aerofoil 11, e.g. by adhesive. The surface part 25 is configured so that it lies contiguously with the surrounding upper aerofoil surface 18 so there is no or only a minimal discontinuity where the surface part 25 and the surrounding aerofoil surface 18 interface, indicated at 27.

In the present example, the spigot part 26 receives within it, an end of a flexible conduit 28 which will be discussed in more detail below.

The passive AJVG flow control device, includes an inlet opening 30 for air, which is positioned at or closely adjacent to the lower aerofoil surface 20, in this example closely adjacent the leading edge 15 of the blade 11.

The flow control device includes an inlet fitting 31 which in this example includes a surface part 35 and a hollow spigot part 36.

The inlet opening 30 is provided in the surface part 35 and communicates with the passage 22 via the hollow spigot part 36 of the inlet fitting 31. The inlet fitting 31 is made in a material which is resistant to erosion or other wear at the inlet opening 30, and is secured relative to the inlet position at or closely adjacent to the lower surface 20 of the aerofoil 11, e.g. by adhesive. The surface part 35 of the inlet fitting 31 is configured so that it lies contiguously with the surrounding aerofoil surface 20 so there is no or only a minimal discontinuity where the surface part 35 and the surrounding lower aerofoil surface 20 interface, indicated at 37.

The spigot part 36 of the inlet fitting 31 is connected to the flexible conduit 28.

The aerofoil body 14 in this example, is made by moulding in resin and reinforcing materials. The passage 22 is provided subsequent to moulding, e.g. by drilling. As will be appreciated from the plan view of the flow control device of FIG. 2, the passage 22 typically is not straight, but has two parts 22a and 22b, which are not co-axial, but are inclined, necessarily so that the passage 22 can extend from a desired inlet position 30 to a desired outlet position 21, and each passage part 22a, 22b may be straight and may be provided by drilling. In the absence of the flexible conduit 28, airflow through the passage 22 from the inlet 30 to the outlet 21 would involve an abrupt change of direction where the passage parts 22a, 22b intersect. However the provision of the flexible conduit 28 smooths the intersection for the airflow, thus reducing losses and improving efficiency.

In the particular example shown, the spigot part 26 of the outlet fitting 24, receives the end of the flexible conduit 28 within, as does the spigot part 36 of the inlet fitting 31, although the inlet fitting 31 has an inner abutment so that the position of the flexible conduit 28 relative to the inlet fitting 31 may be fixed. The flexible conduit 28 may be connected to the respective inlet and outlet fittings 31, 24 otherwise, although a method of installing the flow control device will be described for the particular configuration as seen in the drawings.

When the aerofoil body 14 had been moulded, the passage 22 may be provided by drilling the respective passage parts 22b, 22a from the upper aerofoil surface outlet position 21, and from the inlet position 30 at or adjacent the lower aerofoil surface 20, respectively.

The aerofoil surface 18, 20 around the respective passage outlet 21 and inlet 30 is then cut away to produce a respective recess to receive the respective surface part 25 of the outlet fitting 24 and surface part 33 of the inlet fitting 31, so that the surface parts 25, 35 can be secured, e.g. by adhesive, so as to lie contiguously with the surrounding aerofoil surface 18, 20.

First the inlet fitting 31 is secured to the body 14. The flexible conduit 28 may be already secured to the spigot part 36 of the inlet fitting 31 or may be subsequently secured, e.g. by adhesive after feeding into the passage 28 from the outlet opening 21.

The flexible conduit 28 may extend outwardly of the upper surface 18 of the aerofoil 11 at this time.

Next the outlet fitting 21 is passed over the flexible conduit, which is then connected inside the spigot part 26 of the outlet fitting 24, e.g. by adhesive, and the outlet fitting 24 is secured relative to the upper surface 18 of the aerofoil 11 as shown, again, desirably by adhesive.

If the flexible conduit 28 is extending outwardly of the upper aerofoil surface 18, this may then be cut flush with the upper aerofoil surface 18.

The flexible conduit 28 in this example may be of polyurethane for example, and of round cross section for most efficient airflow through the passage 22. The inlet opening 30 provided through the hollow spigot 36 may be of larger cross section than the flexible conduit 28 as shown, but the cross section of the actual opening 30 in the surface part 35 of the inlet fitting 31 need not be circular but may be of any desired shape for most-efficient passage of air into the opening 30.

The actual outlet opening 21 formed in the surface part 25 of the outlet fitting 24 may typically be a slot or other shape as desired for affecting the airflow over the upper aerofoil surface 18, optimally.

In another example, the flexible conduit 28 may be integral or monolithic with at least one of the inlet 31 and outlet 24 fittings.

Flow control devices may be retrofitted to existing aerofoils, or provided during aerofoil fabrication, subsequent to moulding the aerofoil body 14.

Although the invention has been described in relation to an aerofoil which is a rotor blade 11, the invention may be applied to fixed aircraft wings, or to any other aerofoil.

The invention claimed is:

1. An aerofoil having
    a cambered body for generating lift, the cambered body extending longitudinally and defining in lateral cross section an upper curved surface and a lower surface, and wherein said upper and lower surfaces meet at a leading edge and a trailing edge, and
    at least one flow control device, the flow control device including
        a passage within the cambered body, and
        a passage outlet at the upper curved surface of the cambered body,
        whereby in use, air from the passage passes through the passage outlet to affect airflow over the upper curved surface of the cambered body over at least a range of incidence angles of the leading edge,
        wherein the passage outlet is formed by an outlet fitting which is secured relative to the upper curved surface of the cambered body,
        wherein the outlet fitting includes an uppermost fitting surface which lies contiguously with the surrounding upper curved surface so that there is no or only a minimal discontinuity at a surface interface of the uppermost fitting surface and the surrounding upper curved surface, and
        wherein the uppermost fitting surface further includes an opening which communicates with the passage within the cambered body.

2. An aerofoil according to claim 1 wherein the outlet fitting is made in a durable material which is resistant to erosion, and is fitted to the upper curved surface so that the surface interface between the outlet fitting and the upper curved surface is smooth.

3. An aerofoil according to claim 1 wherein the flow control device further includes a passage inlet for air at or closely adjacent to a lower surface, the air passing into the passage inlet and flowing to the opening at the upper curved surface afforded by the outlet fitting, by the movement of the cambered body through the air.

4. An aerofoil according to claim 3 wherein the flow control device further includes an inlet fitting which is secured relative to the cambered body at an inlet position at or closely adjacent the lower surface, the inlet fitting including a lowermost fitting surface which lies contiguously with the surrounding lower surface so that there is no or only a minimal discontinuity at a surface interface of the lowermost fitting surface and the surrounding lower surface, the lowermost fitting surface of the inlet fitting further including an inlet opening which communicates with the passage within the cambered body.

5. An aerofoil according to claim 4 wherein the inlet fitting is made in a durable material which is resistant to erosion, and fitted to the lower surface so that the surface interface between the inlet fitting and the lower surface is smooth.

6. An aerofoil according to claim 1 wherein a flexible conduit is provided within the passage, the conduit extending to the passage outlet.

7. An aerofoil according to claim 6 wherein one of the inlet fitting and the outlet fitting is interconnected with the flexible conduit.

8. An aerofoil according to claim 6 wherein the outlet fitting includes a hollow spigot part which extends into the passage for interconnection to the flexible conduit.

9. An aerofoil according to claim 4,
    wherein a flexible conduit is provided within the passage, the conduit extending to the passage outlet, and
    wherein the outlet fitting includes a hollow spigot part which extends into the passage for connection to the flexible conduit.

10. An aerofoil according to claim 1 wherein the cambered body is one of a fixed wing of an aircraft or a rotor blade of a main sustaining or tail rotor of a helicopter.

11. An aerofoil according to claim 10 wherein a plurality of flow control devices are provided along a leading edge of the cambered body.

12. An aerofoil having
    a cambered body for generating lift, the cambered body extending longitudinally and defining in lateral cross section an upper curved surface and a lower surface, and wherein said upper and lower surfaces meet at a leading edge and a trailing edge, and
    at least one flow control device, the flow control device including
        a passage within the cambered body, and
        a passage inlet at a position at or adjacent to the lower surface of the cambered body,
        whereby in use, air passes into the passage inlet and flows to an outlet on the upper curved surface to affect airflow over the upper curved surface of the cambered body over at least a range of incidence angles of the leading edge, wherein the passage inlet is formed by an inlet fitting which is secured at an inlet position at or closely adjacent the lower surface of the cambered body, wherein the inlet fitting includes a lowermost fitting surface which lies contiguously with the surrounding lower surface so that there is no or only a minimal discontinuity at a surface interface of the lowermost fitting surface and the surrounding lower surface of the cambered body, and wherein the lowermost fitting surface further includes an inlet opening which communicates with the passage within the cambered body.

13. An aircraft having an aerofoil, the aerofoil having a cambered body for generating lift, the cambered body extending longitudinally and defining in lateral cross section an upper curved surface and a lower surface, and wherein said upper and lower surfaces meet at a leading edge and a trailing edge, and at least one flow control device, the flow control device including a passage within the cambered body, and a passage outlet at the upper curved surface of the cambered body, whereby in use, air from the passage passes through the passage outlet to affect airflow over the upper curved surface of the cambered body over at least a range of incidence angles of the leading edge, wherein the passage outlet is formed by an outlet fitting which is secured relative to the upper curved surface of the cambered body, wherein the outlet fitting includes an uppermost fitting surface which lies contiguously with the surrounding upper curved surface so that there is no or only a minimal discontinuity at a surface interface of the uppermost fitting surface and the surrounding upper curved surface interface, and wherein the uppermost fitting surface further includes an opening which communicates with the passage within the cambered body.

14. An aircraft having an aerofoil, the aerofoil having a cambered body for generating lift, the cambered body extending longitudinally and defining in lateral cross section an upper curved surface and a lower surface, and wherein said upper and lower surfaces meet at a leading edge and a trailing edge, and at least one flow control device, the flow control device including a passage within the cambered body, and a passage inlet at a position at or adjacent to the lower surface of the cambered body, whereby in use, air passes into the passage inlet and flows to an outlet on the upper curved surface to affect airflow over the upper curved surface of the cambered body over at least a range of incidence angles of the leading edge, wherein the passage inlet is formed by an inlet fitting which is secured at an inlet position at or closely adjacent the lower surface of the cambered body, wherein the inlet fitting includes a lowermost fitting surface which lies contiguously with the surrounding lower surface so that there is no or only a minimal discontinuity at a surface interface of the lowermost fitting surface and the surrounding lower surface of the cambered body, and wherein the lowermost fitting surface further includes an inlet opening which communicates with the passage within the cambered body.

15. A method of making an aerofoil including the steps of:

providing a passage within a cambered body, the cambered body extending longitudinally and defining in lateral cross section an upper curved surface and a lower surface so that the surfaces meet at a leading edge and a trailing edge, said providing step including the step of extending the passage from an inlet position at or adjacent the lower surface and to a passage outlet at the upper curved surface to affect airflow over the upper curved surface of the cambered body, and at least one of a) securing relative to the upper curved surface of the cambered body an outlet fitting, said securing step a) including the steps of i) locating an uppermost fitting surface of the outlet fitting to lie contiguously with the surrounding upper curved surface whereby there is no or only a minimal discontinuity at a surface interface of the uppermost fitting surface and the surrounding upper curved surface, and ii) communicating an opening of the outlet fitting with the passage within the cambered body, and b) securing at the inlet position at or adjacent to the lower surface, an inlet fitting, said securing step b) including the steps of i) locating a lowermost fitting surface of the inlet fitting to lies contiguously with the surrounding lower surface whereby there is no or only a minimal discontinuity at a surface interface of the lowermost fitting surface and the surrounding lower surface, ii) communicating an inlet opening of the inlet fitting with the passage within the cambered body.

16. A method according to claim 15, which includes both said securing step a) and said securing step b) and wherein said providing step includes providing a flexible conduit between the inlet and outlet fittings.

17. A method according to claim 16, wherein said providing includes:

providing a first passage part by drilling from the lower surface at a predetermined incline and position, and providing a second passage part by drilling from the upper curved surface at a predetermined incline and position so that the first and second passage parts intersect.

18. An aerofoil according to claim 1 wherein the cambered body is made of a moulded compound material.

19. An aerofoil according to claim 12 wherein the cambered body is made of a moulded compound material.

20. An aerofoil according to claim 13 wherein the cambered body is made of a moulded compound material.

21. An aerofoil according to claim 14 wherein the cambered body is made of a moulded compound material.

22. A method according to claim 15, wherein the cambered body is a moulded compound material.

* * * * *